Nov. 23, 1937.  A. B. KINZEL  2,099,896
INDICATING EXTENSOMETER
Filed Sept. 24, 1932  2 Sheets-Sheet 1
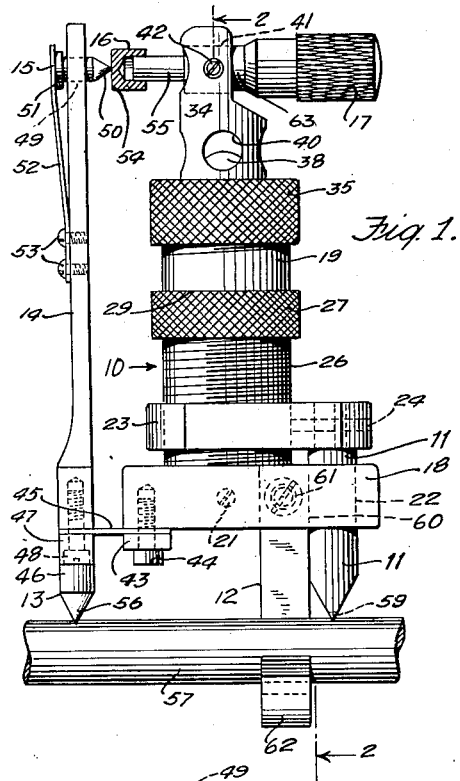
Fig. 1.
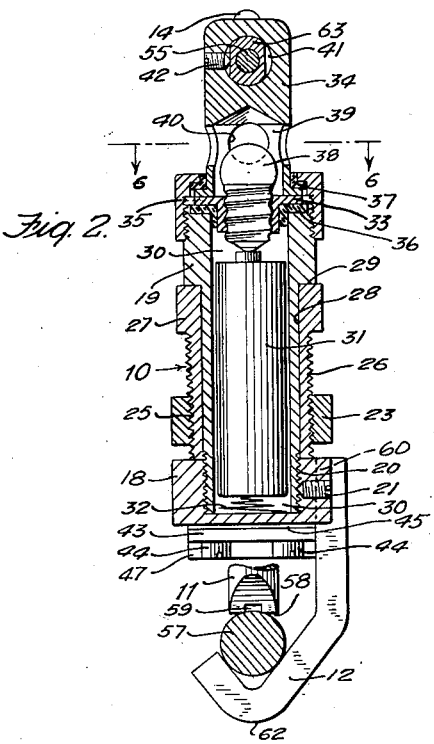
Fig. 2.
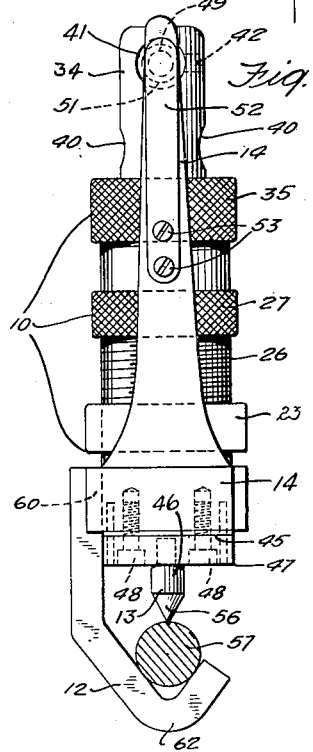
Fig. 3.
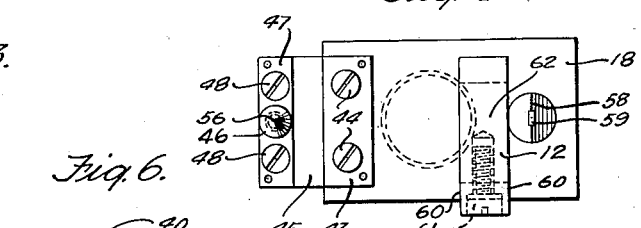
Fig. 4.
Fig. 6.
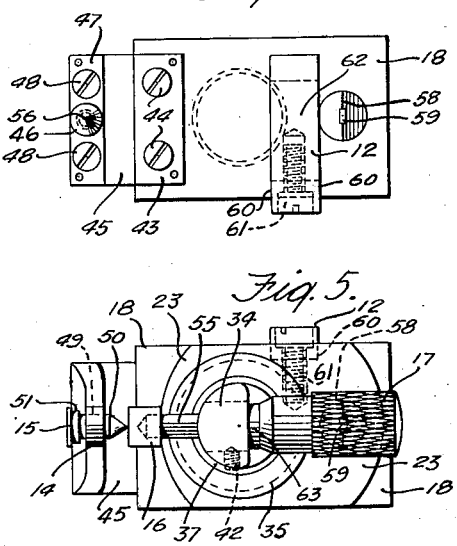
Fig. 5.
INVENTOR
AUGUSTUS B. KINZEL
BY
ATTORNEY Nov. 23, 1937.  A. B. KINZEL  2,099,896
INDICATING EXTENSOMETER
Filed Sept. 24, 1932    2 Sheets-Sheet 2

INVENTOR
AUGUSTUS B. KINZEL

BY

ATTORNEY

Patented Nov. 23, 1937

2,099,896

UNITED STATES PATENT OFFICE 2,099,896

INDICATING EXTENSOMETER

Augustus B. Kinzel, Flushing, N. Y., assignor, by mesne assignments, to Union Carbide and Carbon Corporation, a corporation of New York Application September 24, 1932, Serial No. 634,695

18 Claims. (Cl. 33—148)

The invention pertains to improvements in extensometers employed to indicate the yield point and measure the degree of elongation of test specimens and especially those of cylindrical contour or shape.

Some of the objects of the invention are to provide an extensometer that is self contained, small in size, neat in appearance, easy to read, reliable and accurate in operation, easy to attach, and rugged in structure.

Another object is to provide an extensometer with an electrically operated visual indicator, such as a lamp bulb, that may be observed in dark locations and at a considerable distance.

Another object is to provide an extensometer with electric indicating and energizing means contained therein and protected from liability to damage.

Another object is to provide an extensometer with a visual indicator that is operated when a predetermined degree of elongation has been reached thereby obviating the necessity of continually or closely watching the indicator.

Another object is to provide an extensometer with a hinge for the movable leg thereof that normally maintains it in proper position for attachment and operation.

Another object is to provide an extensometer with means for attaching it to a test specimen having a three point contact adapted to hold the extensometer on the specimen after the latter has been broken.

Another object is to provide an extensometer with means for attaching it to a test specimen that exerts greater pressure on one leg than on the other, and providing one leg with a greater area of contact than the other, to prevent injury to the legs upon the breaking of a test specimen.

Another object is to provide an extensometer with separable contacts to operate an electric visual indicator, and means for limiting the pressure between the contacts to prevent injury thereto upon the breaking of a test specimen.

Another object is to provide an extensometer with an adjustable electric contact carried by a member supported by interfitting threads between which electric current passes to operate a visual indicator, and an electrically conductive lubricant on said threads to maintain a current path of low resistance therebetween.

Another object is to provide an extensometer with means for attaining resilient contact between the measuring legs and a test specimen to prevent error in indication due to changes in the cross sectional shape of the specimen during test.

The above and other objects and novel features will appear in the following specification and the accompanying illustrations in which:

Fig. 1 is a front view of an extensometer embodying my invention,

Fig. 2 is a sectional view along line 2—2 of Fig. 1,

Fig. 3 is a view of the left side of the extensometer shown in Fig. 1,

Fig. 4 is a bottom view of the same,

Fig. 5 is a top view of the same,

Fig. 6 is a sectional view along line 6—6 of Fig. 2, and

Figure 7:
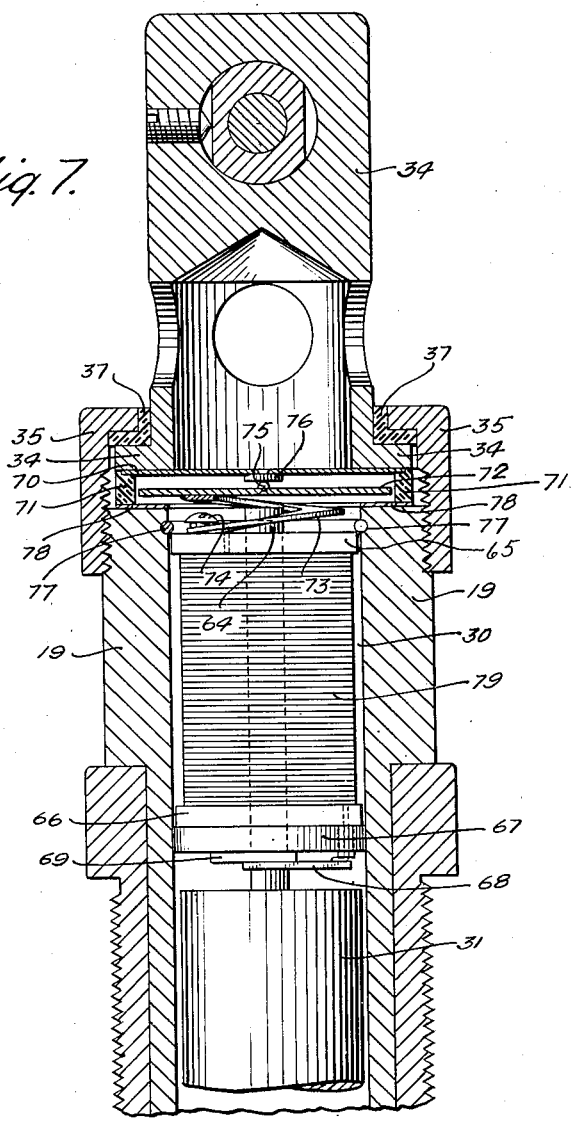
Fig. 7 is an enlarged fragmentary sectional view along a vertical plane of an alternative form of my extensometer comprising an audible indicator.

My improved extensometer shown in the accompanying drawings is entirely self contained or integral with no separate or movable parts that must be assembled or held in some special position when the extensometer is attached to a test specimen. This greatly facilitates the operation of attaching the extensometer to a test specimen, especially in close quarters, and the means for supporting the movable leg to attain this result is deemed novel.

My improved extensometer is also provided with an electric light bulb as a visual indicator, and this feature as well as that of locating the indicator and suitable energizing means within the extensometer where they are maintained in contact and protected from injury is considered broadly novel.

My improved extensometer is also provided with separable contacts for operating the indicator when a predetermined elongation of the test specimen has been reached and this feature and that of limiting the pressure on the contacts to protect them from liability of injury is considered new.

My improved extensometer is also provided with two measuring legs of which one has a greater area of contact than the other, and this feature and that by which the attaching clip exerts a greater pressure on the leg having the larger area of contact is considered broadly new as a means for protecting the legs from liability of injury.

The path of the electric current that energizes the visual indicator of my improved extensometer passes through an adjustable member and the interfitting threads by which it is supported, and the provision of an electrically conductive lubricant for these threads to reduce the resistance of the electric circuit therethrough is also considered a novel feature.

My improved extensometer is also provided with a resilient support for one of the legs thereof by which resilient contact between the extensometer and a test specimen is attained, and this feature is also considered novel.

My improved extensometer is also provided with means for moving one of the measuring legs with respect to the body for the purpose of attaching the extensometer to a test specimen, and this feature is also considered novel.

One example of an improved extensometer in which the novel features of my invention are incorporated is illustrated by the preferred embodiment shown in the accompanying drawings.

In general my extensometer comprises a single unitary body or casing containing a perceptible indicator, such as an electric lamp bulb, and means for energizing the indicator, such as an electric battery. The body is provided with two measuring legs adapted to be slightly embedded in a test specimen, and a clip for holding the legs in contact therewith. One of the legs is movable to operate the indicator, and the other leg is adjustable to attach the extensometer to a test specimen. The movable leg is provided with a movable contact that cooperates with an adjustable contact to operate the indicator. The adjustable contact is carried by a micrometer head which in turn is carried by the body and serves to measure the separation between the contacts. The path for the electric current is through the interfitting threads between the barrel and the spindle of the micrometer and these threads are lubricated by a lubricant that is electrically conductive, such as graphite, to provide a path of low resistance through the extensometer. The movable leg is carried by a resilient hinge that holds the leg in operating position and also provides a resilient contact between the extensometer and a test specimen.

More specifically my improved extensometer comprises a body 10 having an adjustable leg 11, a hook or clip 12 and a movable leg 13. The movable leg 13 comprises a lever bar 14 provided with a movable contact 15 adapted to engage an adjustable contact 16 carried by a micrometer head 17 mounted upon the body.

The body 10 comprises a base 18 in which an elongated barrel 19 is rigidly mounted by suitable means such as interfitting threads 20 and a set screw 21 which is adapted to hold the threaded parts against relative movement. Base 18 is provided with a suitable opening 22 in which the adjustable leg 11 is adapted to move. The upper end of leg 11 is rigidly secured in a yoke 23 by a pin 24. Yoke 23 is provided with an opening having internal threads 25 interfitting external threads 26 on a sleeve 27 mounted on a reduced portion 28 of barrel 19 between the upper surface of base 18 and shoulder 29 at the upper end of the reduced portion. Sleeve 27 is adapted to be manually rotated on barrel 19 to move yoke 23 and adjustable leg 11 with respect to base 18 for a purpose to be described later.

Barrel 19 is provided with a cylindrical axial opening 30 for a battery or dry cell 31 and a battery support spring 32. Mounted upon the upper end of barrel 19 is a bulb socket 33 and a somewhat smaller integral head 34, which are held in place by a removable clamping nut 35 which is threaded to the upper end of the barrel. A flanged insulating washer 36 electrically separates bulb socket 33 from barrel 19 and another flanged insulating washer 37 electrically separates clamping nut 35 from head 34 which is in electrical contact with bulb socket 33. A lamp bulb 38 is mounted in bulb socket 33 with the central terminal thereof in contact with the central terminal of cell 31 and the globe extending upward into an opening 39 in the perforate head 34 which is provided with a plurality of openings 40 in the outer wall through which the light of the lamp bulb may be observed.

The upper end of head 34 is provided with a transverse opening 41 in which micrometer head 17 is mounted by means of a set screw 42. This micrometer head is of a well known type and needs no further description other than the means for lubricating the threads thereof.

Mounted on the opposite end of base 18 from adjustable leg 11 by means of a clamp 43 and screws 44 is a resilient member, spring, or resilient hinge 45, which carries the movable leg 13 which comprises a movable foot 46 rigidly mounted as by means of a press fit in a supporting plate 47 which is secured to spring 45 by screws 48 passing upward through the plate 47 and spring 45 into the lever bar 14.

The upper end of lever bar 14 is provided with an opening 49 in alinement with the spindle of micrometer head 17 and in this opening movable contact 15 is loosely mounted. This contact is provided with a conical point 50 on the end facing the micrometer head and a flat head 51 on the side of lever bar 14 away from the micrometer head and this head 51 is normally held against the lever bar by a flat spring or resilient member 52 which is secured to the lever bar 14 by screws 53.

The adjustable contact 16 is provided with a flat face 54 adapted to engage conical point 50 of contact 15 and this adjustable contact is rigidly mounted upon the adjustable spindle 55 of micrometer head 17 with which it is moved with respect to contact 15.

Movable foot 46 of movable leg 13 is provided with a conical point 56 adapted to be slightly embedded in the outer surface of a test specimen, such as the fragmentary portion shown at 57, and adjustable leg 11 is provided with a knife edge 58 also adapted to be slightly embedded in a test specimen. This knife edge 58 may have a portion 59 removed from the center thereof to provide better contact with less pressure.

In order to hold legs 11 and 13 in contact with the test specimen the extensometer is provided with a hook or clip 12 rigidly secured in a groove 60 in the side of base 18 by suitable means such as screw 61. Clip 12 is provided with an outer end 62 adapted to partially encircle a test specimen, such as 57, at a point somewhat nearer adjustable leg 11 than movable leg 13.

The knife edge 58 on the adjustable leg 11 has an area of contact with the test specimen greater than that of point 56 of movable leg 13, and clip 12 is located nearer the adjustable leg so that greater pressure is exerted upon the adjustable leg than on the movable leg. This arrangement removes the tendency of clip 12 to cause relative movement between one of the legs and the test specimen during elongation, and it also prevents damage to the contact points of the measuring legs when the test specimen is broken as will be pointed out Furthermore, due to the location of clip 12 the extensometer will remain hanging to the test specimen after it is broken instead of dropping free with the attendant liability of damage.

The path for the electric circuit through the extensometer is as follows:

From the upper or central terminal of battery 31 to bulb 38, bulb socket 33, head 34, stationary portion 63 of micrometer head 17, across the threads between the stationary portion 63 and spindle 55 of the micrometer, adjustable contact 16, movable contact 15, lever bar 14, spring 45, base 18 to supporting spring 32, resting on the base and then to the bottom of battery 31.

When the interfitting threads between the barrel and the spindle of the micrometer are lubricated with ordinary oil considerable resistance is introduced into the electric circuit. Therefore, all oil is removed from these threads and they are lubricated with an electrically conductive lubricant, such as graphite, in order to reduce the electrical resistance of the circuit. This feature contributes materially to the successful operation of the extensometer.

Instead of a visual indicator, such as a lamp bulb, my extensometer may be provided with an audible indicator, such as that shown in Fig. 7.

In this embodiment barrel 19 is of sufficient length to provide space in opening 30 above battery 31 for the electromagnet of the audible indicator. This magnet comprises a core 64 having a dielectric head 65 firmly secured thereon near the upper end by suitable means, such as a joint of compression, and a dielectric head 66 secured thereon near the lower end by similar means.

An annular or circular magnetic pole piece 67 closely fitting the wall of opening 30 is similarly secured to core 64 below head 66, and an electrical contact 68 is secured to the under side of pole piece 67 at the center thereof, from which it is electrically separated by a suitable dielectric member 69.

A thin, resilient, conductive diaphragm 70 is supported above the upper end of barrel 19 in a recess in the upper side of a dielectric ring or washer 71 supported by the barrel. Head 34 is secured to the upper surface of diaphragm 70 by nut 35 from which it is electrically separated by flanged insulating member 37.

A circular, magnetic, conductive, armature 72 is located in the space between the upper end of barrel 19 and the under side of diaphragm 70, and a spiral or other suitable spring 73 having one end secured to head 65 by suitable means, such as screw 74, and the other end secured to armature 72 by suitable means, such as solder, resiliently presses electrical contact 75, rigidly secured to the upper side of armature 72 at the center thereof, against electrical contact 76 rigidly secured to the under side of diaphragm 70.

One end of a winding of insulated conductive wire on magnet 79 is electrically connected to the lower end of spring 73 by screw 74 and the other end is connected to contact 68 by suitable means, such as solder.

The electrical circuit through the audible indicator is from the upper pole of battery 31 to contact 68, the winding of magnet 79, spring 73, armature 72, contacts 75, 76, diaphragm 70, to head 34. The remainder of the path is the same as in the preceding example.

The magnetic path from the lower end of core 64 back to the gap between the upper end of barrel 19 and armature 72 is completed by pole piece 67 and barrel 19. Therefore, both magnetic poles of the magnet are on a plane near armature 72.

When the electrical circuit is closed by contacts 15 and 16, electric current flows through the winding of the magnet energizing the magnetic circuit and moving the armature downward thereby breaking the circuit between contacts 75 and 76. As the circuit is interrupted spring 73 restores the armature and the impact on diaphragm 70 produces an audible sound. This again closes the circuit and the action is rapidly repeated as long as contacts 15 and 16 remain closed. The rapid blows of the armature on the diaphragm produce a hum or buzz that may be heard some distance.

In case spring 73 is not strong enough to hold the magnet in place in barrel 19 other means may be provided, such as spring 77.

Also, one or both of the magnetic poles may be covered by thin dielectric material 78, such as paper, mica, or fiber, which may be held in place by suitable adhesive such as sodium silicate, or by the pressure of ring 71 thereon. Furthermore, the under surface of armature 72 may be covered by material such as that described.

In order to attach the extensometer to a test specimen a center punch mark is preferably made on one end of the specimen for the point 56 of the extensometer. This center punch mark is for convenience in attaching the extensometer, however, and therefore its use is not imperative. After the specimen is mounted in the tensile machine adjustable leg 11 of the extensometer should be moved up away from the clip 12 by rotating sleeve 27 on the barrel 19 of the instrument. The extensometer is then placed on the specimen with point 56 in the center punch mark and the clip 12 around the specimen. Sleeve 27 is then rotated until adjustable leg 11 bears on the specimen and clamps the extensometer in place. Sufficient pressure should be used so that the knife edge 58 will not slip when elongation takes place. Excessive pressure, however, is not necessary.

After the extensometer is properly mounted spindle 55 of micrometer head 17 should be screwed up until contact 16 just engages contact 15 and the light goes on. This position is the zero reading for the specimen.

It is recognized by the American Society for Testing Materials that an elongation of .01 inch in a 2 inch gauge length indicates the yield point of many materials including structural steel and malleable iron. To determine the yield point with my extensometer it is only necessary to back off the micrometer head two complete turns or .05 inch. This distance represents .01 inch times the 5 to 1 ratio of movement between point 56 and movable contact 15. With the extensometer in this position additional load may be applied to the test specimen and increased until the light flashes. This flash indicates that the yield point has been reached and the tension may be read from the load indicating device on the tensile testing machine.

The extensometer is also valuable as a strain gauge to determine the elongation of a specimen under a specific load. This method may be used to plot stress-strain diagrams showing the characteristics of materials. To use the extensometer for this purpose back the micrometer head a predetermined or desired distance from the zero reading for the specimen. Then apply the load until the light goes on, and read the stress from the load indicating device of the testing machine.

To obtain the next strain reading back the head out again and apply the required additional load. This procedure may be repeated with such loadings as are required to plot the necessary stress-strain diagram.

In order to prevent injury to contacts 15 and 16 when a test specimen, upon which my extensometer is mounted, is broken during test, contact 15 is loosely mounted in lever bar 14 to which it is held by spring 52 in such a way that when the pressure upon the contacts 15 and 16 exceeds the tension or pressure of spring 52 contact 15 will move with respect to lever bar 14, and the pressure upon the contacts will be limited by the tension of spring 52 which is not great enough to cause injury to the contacts or other parts of the extensometer.

The resilient hinge or spring 45 by which movable leg 13 is attached to body 10 is a feature that contributes materially to the convenience and accuracy of my extensometer. The hinge holds leg 13 in the correct operating position with respect to body 10 and leg 11 with point 56 exactly two inches from knife edge 58 so that the extensometer may be attached to a test specimen without holding this leg in some particular position as would be necessary with a pivot or joint such as employed heretofore. This spring also provides resilient contact or pressure between the extensometer and a test specimen so that slight changes in the cross sectional shape of the specimen during test does not remove the pressure from the measuring legs and allow them to move with respect to the specimen and introduce errors.

Although the position of leg 11 may be changed with respect to body 10 for the purpose of attaching the extensometer to a test specimen, this leg is considered as a stationary leg from the standpoint of operation, as during a test it remains stationary with respect to body 10 while leg 13 moves with respect thereto to operate the indicator or light the lamp bulb.

An important advantage derived from the ability to move leg 11 with respect to the body of the extensometer in a direction transverse to the axis of the test specimen is that this leg may be sharpened at will without altering the position of the extensometer with respect to the test specimen and thus impairing its accuracy. Also foot 46 of leg 13 may be readily replaced by removing screws 48 without the necessity of replacing the entire leg, and without danger of altering the dimension of the leg or its position with respect to the resilient hinge.

The extensometer as shown is adapted for cylindrical test specimens having a diameter of .505 inch but it may be adapted to specimens of a different size by removing screw 61 and substituting a hook or clip 12 of a size suitable for the particular specimen to be tested.

It is understood that where no material is mentioned that those ordinarily employed are used, and that they may be hardened, tempered, or heat-treated in places where resistance to strain or abrasion is required. Also, where a part is not defined as an insulator or dielectric that the material employed is electrically conductive such as iron or steel.

The cooperating surfaces of contacts 15 and 16 are provided with a facing or coating of silver, nickel, or silver solder, but they may be entirely of any suitable metal, such as one of these, or they may be faced with other suitable metals, such as tungsten or an alloy containing tungsten.

It is also understood that the battery or dry cell is of a size and structure well known in the art to which it appertains, and that the electric light bulb is also of a well known type having a filament of a resistance adapted to operate on the voltage of the battery or cell employed.

Furthermore, the micrometer head is of standard and well known structure, and while the size thereof is not important to the operation of the extensometer a size having a range of movement of one half inch is employed for convenience on account of its smaller size.

It is also understood that the size, shape, material, heat treatment, finish, and relative position of the components parts may be changed as long as the general function is retained without departing from the range of the invention or the scope of the claims.

I claim:—

1. An extensometer adapted for being mounted on a test specimen and comprising a body; a mobile leg; a stationary leg; and means for clamping said legs to a test specimen with greater pressure on said stationary leg than on said mobile leg, said means comprising a member partially encircling said test specimen and provided with a contact surface a fixed distance from said body engaging the opposite side of said test specimen from said legs relatively closer to said stationary leg than to said mobile leg.

2. An extensometer adapted to be mounted on a test specimen and comprising a leg having a point adapted to make contact with said specimen; a leg having a knife edge adapted to make contact with said specimen; and means for clamping said legs to a test specimen with a greater pressure on said knife edge than on said point, said means comprising a contact surface rigidly secured to said extensometer and engaging the opposite side of said specimen from said legs relatively close to said knife edge.

3. An extensometer comprising a body; a pair of legs carried by said body; a rigid clip between said legs partially encircling a test specimen; means for moving one of said legs with respect to said body to clamp said extensometer to a test specimen; and means for providing resilient contact between said extensometer and said specimen comprising a resilient mounting for the other of said legs.

4. An extensometer comprising a body adapted to be mounted on a test specimen; two legs adapted to make contact with said specimen; a rigid clip partially encircling said specimen and adapted to hold said legs in contact with said specimen; and means for moving one of said legs with respect to said body to clamp said extensometer to said specimen.

5. An extensometer comprising an electric indicator; a movable leg operably secured to said extensometer; means comprising a movable contact and a stationary contact for conducting electric current in a circuit through said indicator, said movable contact being movably mounted upon said leg; means for limiting the pressure upon said contacts while said circuit is closed, said means comprising a spring secured to said leg and forcing said movable contact toward said stationary contact.

6. An extensometer comprising a body having a barrel and a base with an opening therein; a mobile leg carried by said base; an adjustable leg in said opening; a yoke fixed to said adjustable leg; and a sleeve threaded to said yoke and rotatable on said barrel to move said adjustable leg with respect to said body.

7. An extensometer comprising a body; a pair of legs adapted to make contact with a test specimen when said extensometer is operably mounted thereon; means for securing said extensometer to a test specimen so that breakage of such specimen disengages said specimen from said legs but not from said means thereby preventing injury to said extensometer, said means comprising a hook substantially encircling said specimen between said legs and engaging the opposite side of said specimen relatively closer to one of said legs than to the other of said legs.

8. An extensometer comprising a body provided with a movable leg and a fixed leg in operative relation thereto adapted to be mounted on a cylindrical test specimen; a fixed clip rigidly secured to said body and adapted to partially encircle said specimen between the portions engaged by said legs; means for moving said fixed leg with respect to said body in a direction transverse to the axis of said specimen to clamp said extensometer on said specimen; and means for providing relative resilient movement of said movable leg with respect to said body in a direction transverse to the axis of said specimen comprising a resilient connection between said movable leg and said body to provide resilient contact between said extensometer and said specimen.

9. An extensometer or the like comprising in combination, a supporting body; a pair of spaced legs carried by said body and adapted to engage the same side of a test specimen, one of said legs being adjustable relatively to said body and the other of said legs being fulcrumed between its ends and carrying a contact; means for securing said extensometer to a test specimen upon movement of said adjustable leg, said means comprising a clamp carried by said body between said legs and adapted to engage the other side of said test specimen between the points engaged by said legs; an adjustable contact carried by said body and engageable by said contact on the fulcrumed leg; and electrical signal means in circuit with said contacts.

10. An extensometer or the like as claimed in claim 9, in which said supporting body comprises a barrel, and said signal means comprises an electric cell and an electric lamp housed in said barrel.

11. An extensometer or the like as claimed in claim 9, in which said fulcrumed leg is carried by a yieldable element which constitutes its fulcrum.

12. An extensometer or the like as claimed in claim 9, in which said supporting body comprises a barrel, and said legs extend lengthwise of the axis of said barrel; in combination with a micrometer carried by said barrel, extending perpendicular to the axis of the barrel, and carrying said adjustable contact.

13. An extensometer or the like as claimed in claim 9, in which said supporting means comprises a barrel, said legs are disposed at one end of said barrel, said adjustable contact is carried by a micrometer secured to the other end of said barrel, and said signal means comprises a lamp and battery secured within said barrel between said legs and said micrometer.

14. An extensometer or the like as claimed in claim 9, in which said body is an elongated barrel, said contact carrying leg is disposed adjacent the side of said barrel substantially parallel with the axis thereof, and said adjustable contact is carried by a micrometer secured to one end of said barrel transverse to the axis thereof.

15. An extensometer or the like as claimed in claim 9, in which the contact that is carried by the fulcrumed leg is secured in a normally fixed position with respect to said leg by a resilient member forcing said first-mentioned contact toward said adjustable contact so that said leg may move with respect to said contact and prevent injury to said extensometer when the pressure between said contacts exceeds a predetermined amount.

16. An extensometer or the like as claimed in claim 9, in which said supporting body comprises a barrel provided with a plurality of openings in the wall thereof, and said signal means comprises a battery and a lamp secured within said barrel so that said lamp is visible through said openings.

17. An extensometer or the like comprising, in combination, a supporting body comprising a barrel; a pair of spaced legs carried by said body and adapted to engage the same side of a test specimen, one of said legs being adjustable relatively to said body and the other of said legs being fulcrumed between its ends and carrying a contact; a clamp carried by said body between said legs and adapted to engage the other side of said test specimen between the points engaged by said legs; an adjustable contact carried by said body and engageable by said contact on the fulcrumed leg; electrical signal means in circuit with said contacts; an externally-threaded rotatable sleeve surrounding said barrel; and threaded means engaging the threaded portion of said sleeve and connected to the adjustable leg.

18. An extensometer or the like comprising, in combination, a supporting body; a pair of spaced legs carried by said body and adapted to engage the same side of a test specimen, one of said legs being adjustable relatively to said body and the other of said legs being fulcrumed between its ends and carrying a contact; a clamp carried by said body between said legs and adapted to engage the other side of said test specimen between the points engaged by said legs; an adjustable contact carried by said body and engageable by said contact on the fulcrumed leg; and electrical signal means in circuit with said contacts; said clamp being in a fixed position with respect to said body, and said adjustable leg being movable with respect to said body to clamp said extensometer to a test specimen.

AUGUSTUS B. KINZEL.